(12) United States Patent
Eccles

(10) Patent No.: US 12,439,861 B1
(45) Date of Patent: Oct. 14, 2025

(54) PLANT POT AND TRAY COMBINATION FOR USE WITH EBB AND FLOOD SUBSTRATES

(71) Applicant: Basket Case Imports Inc., Delta (CA)

(72) Inventor: Celene Eccles, Delta (CA)

(73) Assignee: Basket Case Imports, Inc. (CA)

( * ) Notice: Subject to any disclaimer, the term of this patent is extended or adjusted under 35 U.S.C. 154(b) by 0 days.

(21) Appl. No.: 18/815,922

(22) Filed: Aug. 27, 2024

(51) Int. Cl.
  *A01G 9/04* (2006.01)
  *A01G 9/24* (2006.01)

(52) U.S. Cl.
  CPC .............. *A01G 9/045* (2013.01); *A01G 9/247* (2013.01)

(58) Field of Classification Search
  CPC .......... A01G 9/045; A01G 9/247; A01G 9/00; A01G 9/02; A01G 9/027; A01G 9/028; A01G 9/0297; A01G 9/04; A01G 9/042; A01G 9/047; A01G 31/06; A01G 31/02; A01G 31/00; A01G 31/024
  See application file for complete search history.

(56) References Cited

U.S. PATENT DOCUMENTS

| | | | | |
|---|---|---|---|---|
| 4,887,388 A * | 12/1989 | Waltel, Jr. | ............... | A01G 25/02 47/79 |
| 6,125,577 A * | 10/2000 | Merzweiler | ............... | A47G 7/02 47/39 |
| 6,381,901 B1 * | 5/2002 | Friedman | ............... | A01G 9/028 47/79 |
| 7,020,997 B1 * | 4/2006 | Thomas | ................ | A47F 7/0078 47/39 |
| 9,338,948 B2 * | 5/2016 | DeYoung | ............... | A01G 9/045 |
| D868,621 S | 12/2019 | Diller | | |
| D868,622 S | 12/2019 | Diller | | |
| 11,510,374 B2 | 11/2022 | Visser | | |
| 11,564,360 B2 | 1/2023 | Diller | | |
| 2009/0260285 A1 * | 10/2009 | Smith | ....................... | A01G 9/02 47/86 |
| 2014/0166517 A1 * | 6/2014 | Chapel | ................... | B65D 85/52 |
| 2015/0135588 A1 | 5/2015 | Gergek | | |
| 2021/0029893 A1 * | 2/2021 | Cooley | ..................... | A01G 9/02 |
| 2023/0301244 A1 * | 9/2023 | Devriendt | .............. | A01G 9/045 |

FOREIGN PATENT DOCUMENTS

| | | | | |
|---|---|---|---|---|
| AU | 784331 B2 * | 3/2006 | ............... | A01G 9/02 |
| EP | 3319414 | 5/2018 | | |
| WO | WO9707491 A1 * | 2/1997 | ............... | A01G 9/02 |

* cited by examiner

*Primary Examiner* — David J Parsley
*Assistant Examiner* — Carly W. Lynch
(74) *Attorney, Agent, or Firm* — Baumgartner Patent Law, LLC; Marc Baumgartner

(57) ABSTRACT

A plant pot and tray system, the system comprising: a plurality of plant pots, each plant pot comprising a bottom, which includes a plurality of apertures, a lower step extending outwardly and upwardly from the bottom, four sides extending upwardly from the lower step, an upper step extending outwardly from the sides, a rim extending outwardly from the upper step, a slot in opposing sides of the rim and a reinforcing block on the upper step adjacent to each slot; and a tray, the tray comprising a plurality of receptacles, the plurality of receptacles defined by a base, a raised lip above the base, which defines a central aperture in each receptacle, at least one of four sides that extend upwardly from the base, and a central divider that extends upwardly from the base.

19 Claims, 7 Drawing Sheets

PLANT POT AND TRAY COMBINATION FOR USE WITH EBB AND FLOOD SUBSTRATES

FIELD

The present technology is a plant pot and tray combination that promotes contact between the ebb and flow substrate and the base of the plant pot. More specifically, it is a plant pot with a plurality of apertures in a non-contoured base and tray with dividers that define receptacles, each having a large central aperture.

BACKGROUND

Greenhouse crops require routine watering. The common watering methods include overhead watering, drip irrigation and floor flooding. Some plants, such as tomatoes, do not respond well to overhead watering. Similarly, flowers can be damaged by the spray of an overhead watering system. An alternative to overhead watering is drip irrigation. This is very time consuming to set up such that individual pots are watered and has to be redone whenever the plants are moved. Floor flooding is another alternative method of watering greenhouse crops. While it is easy to irrigate with floor flooding, containers need to be designed to promote even uptake of water.

Some pots and trays, such disclosed in U.S. patent Ser. No. 11/564,360 are poorly suited to floor flooding. Disclosed is a planting pot and tray system comprises a plurality of pots and a tray having multiple receptacles configured to receive the pots. Each pot includes at least one rounded side, and at least one generally flat side, with each receptacle including at least one curved wall and at least one generally straight wall. The receptacles are configured to receive the pots with the rounded and flat sides of the pot engaging with respective walls of the receptacle to whereby the respective shapes of the receptacles and pots orient the pots within the receptacles. A front wall of the receptacle is shorter than the pot whereby a portion of side of the pot is exposed and directed outwardly from the tray. This system does not allow for floor flooding as a means of watering the plants and in fact promotes drainage of water.

U.S. patent Ser. No. 11/510,374 discloses an outer pot configured to accommodate an inner plant pot. The outer pot includes a bottom and at least one side wall extending from the bottom to an opening configured to enable inserting the inner plant pot through the opening. The outer pot is configured for use in an ebb-and-flood grow system, in that: the bottom and the side wall define there between a fluid reservoir. A dome extending from the bottom and the side wall includes at least one through hole for fluid supply to or fluid discharge from the outer pot, where the through hole is arranged at a distance from the bottom to define a volume of the reservoir. Assemblies, ebb-and-flood based watering systems, methods of assembling and growing plants, associated with the outer pot. This is a relatively cumbersome arrangement and fails to provide compact plantings. Further, there are no trays for holding the pots, hence moving the plant pots must be done individually.

United States Patent Application Publication No. 20150135588 discloses a potted plant display system that uses plant trays into which potted plants are placed. Watering of the potted plants is accomplished by filling the plant trays with water and allowing the soil within the pots to absorb the water in a bottom up fashion. Multi-tier or vertical displays are created by using the various display bases into which trays are placed. Plant trays within a tier are interconnected through a conduit system that transfers water from one plant tray to another. A single plant tray within a tier contains a draining adaptor through which water is drained onto a plant tray located on a tier directly below or into a bucket. Water level in the plant trays is controlled by the draining restrictor that is placed into the draining adaptor. During watering, water is applied to a plant tray positioned on the highest tier in a multi-tier display. This system does not allow for floor flooding as the means for watering the plants.

European Patent No. EP3319414 discloses a plant tray made of plastic, comprising a plurality of compartments designed to accommodate at least one planting pot. At least one of the compartments has a bottom with at least one bottom hole, said bottom transitioning at the edges into walls of the plant tray, forming, on the lower face, a support surface for the plant tray, and, on the upper face, at least one support for the planting pot. The bottom defines bottom regions of different heights with respect to a plane of support as a result of a channel that is formed on the lower face as a watering and/or draining channel. A compartment region which is located immediately above the lower bottom region forming the support surface can be watered and/or drained through the bottom hole, the lower bottom region forming at least part of the support. The invention also relates to a system comprising a plant tray. This would not be well suited to ebb and flow watering with mats or gravel substrates as there would not be good contact between the substrate and the entirety of the bottom.

What is needed is a plant pot and tray combination that allows for almost complete contact between the base of plant pot and the substrate upon which the combination is placed. It would be further preferable if the base of the plant pot had multiple apertures and was otherwise non-contoured. It would be further preferable if the plant pots had four sides that were flat to allow for printing on all four sides of the plant pot. It would also be preferable if a method of ebb and flow watering was provided using the plant pot and tray combination.

SUMMARY

Provided is a plant pot and tray combination that allows for almost complete contact between the base of plant pot and the substrate upon which the combination is placed. The base of the plant pot has multiple apertures and is otherwise non-contoured. The plant pots have four sides that are flat to allow for printing on all four sides of the plant pot. A method of ebb and flow watering is provided using the plant pot and tray combination.

In one embodiment, a plant pot and tray system is provided, the system comprising: a plurality of plant pots, each plant pot comprising a bottom, which includes a plurality of apertures, a lower step extending outwardly and upwardly from the bottom, four sides extending upwardly from the lower step, an upper step extending outwardly from the sides, a rim extending outwardly from the upper step, at least one slot in the rim and a reinforcing block on the upper step adjacent to each slot; and a tray, the tray comprising a plurality of receptacles, the plurality of receptacles defined by a base, a raised lip above the base, which defines a central aperture in each receptacle, at least one of four sides that extend upwardly from the base, and a central divider that extends upwardly from the base, wherein the lower step of each plant pot is configured to sit on the lip and the bottom of each plant pot is configured to extend through the central aperture and be aligned with the base.

In the plant pot and tray system, the sides may include a viewing window in each receptacle.

In the plant pot and tray system, the sides may define side pillars between the viewing windows.

In the plant pot and tray system, the central divider may define divider pillars opposite the side pillars.

In the plant pot and tray system, the central divider may include at least one opening between the divider pillars.

In the plant pot and tray system, there may be two rows of at least three receptacles.

In the plant pot and tray system, there may be two rows of four receptacles.

In the plant pot and tray system, the side pillars and the divider pillars may be hollow.

In the plant pot and tray system, each plant pot may be rectangular and each receptacle may be rectangular.

In the plant pot and tray system, each plant pot may have a rounded corner between the sides.

In the plant pot and tray system, each slot may be configured to accept a plant tag.

In another embodiment, a method of watering plants is provided, the method comprising: selecting a plant pot and tray system including a plurality of pots, each having at least one plant in a growth medium in the pot, each of the plurality of pots including a bottom with a plurality of apertures, a lower step which extends upwardly and outwardly from the bottom and sides that extend upwardly from the lower step, and a tray, the tray including a plurality of receptacles, the plurality of receptacles defined by a base, a raised lip above the base, which defines a central aperture in each receptacle, at least one of four sides that extend upwardly from the base, and a central divider that extends upwardly from the base; nesting the plant pot in the receptacle such that the lower step of the plant sits on the lip of the and the bottom of each plant pot extends through the central aperture and is aligned with the base; selecting a substrate; locating the plant pot and tray system on the substrate; and flooding the substrate, thereby watering the plants.

In another embodiment, a plant pot and tray system is provided, the system comprising: a plurality of plant pots, each plant pot comprising a bottom, which includes a plurality of apertures, a lower step extending outwardly and upwardly from the bottom, four sides extending upwardly from the lower step, an upper step extending outwardly from the sides, a rim extending outwardly from the upper step; and a tray, the tray comprising a plurality of receptacles, the plurality of receptacles defined by a base, a raised lip above the base, which defines a central aperture in each receptacle, at least one of four sides that extend upwardly from the base, and a central divider that extends upwardly from the base, wherein the lower step of each plant pot is configured to sit on the lip and the bottom of each plant pot is configured to extend through the central aperture and be aligned with the base.

In the plant pot and tray system, the sides may include a viewing window in each receptacle.

In the plant pot and tray system, the sides may define side pillars between the viewing windows.

In the plant pot and tray system, the central divider may define divider pillars opposite the side pillars.

In the plant pot and tray system, the central divider may include at least one opening between the divider pillars.

In the plant pot and tray system, there may be two rows of at least three receptacles.

In the plant pot and tray system, the tray may consist of an injected molded plastic polymer.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

A plant pot and tray combination, generally referred to as 10 includes plant pots 14 and a tray 16. Each tray 16 holds between 4 and 12 plant pots 14, arranged in two rows, generally referred to as 18. The tray 16 has receptacles 20 arranged in two rows 18 for holding the plant pots 14.

Figure 1:
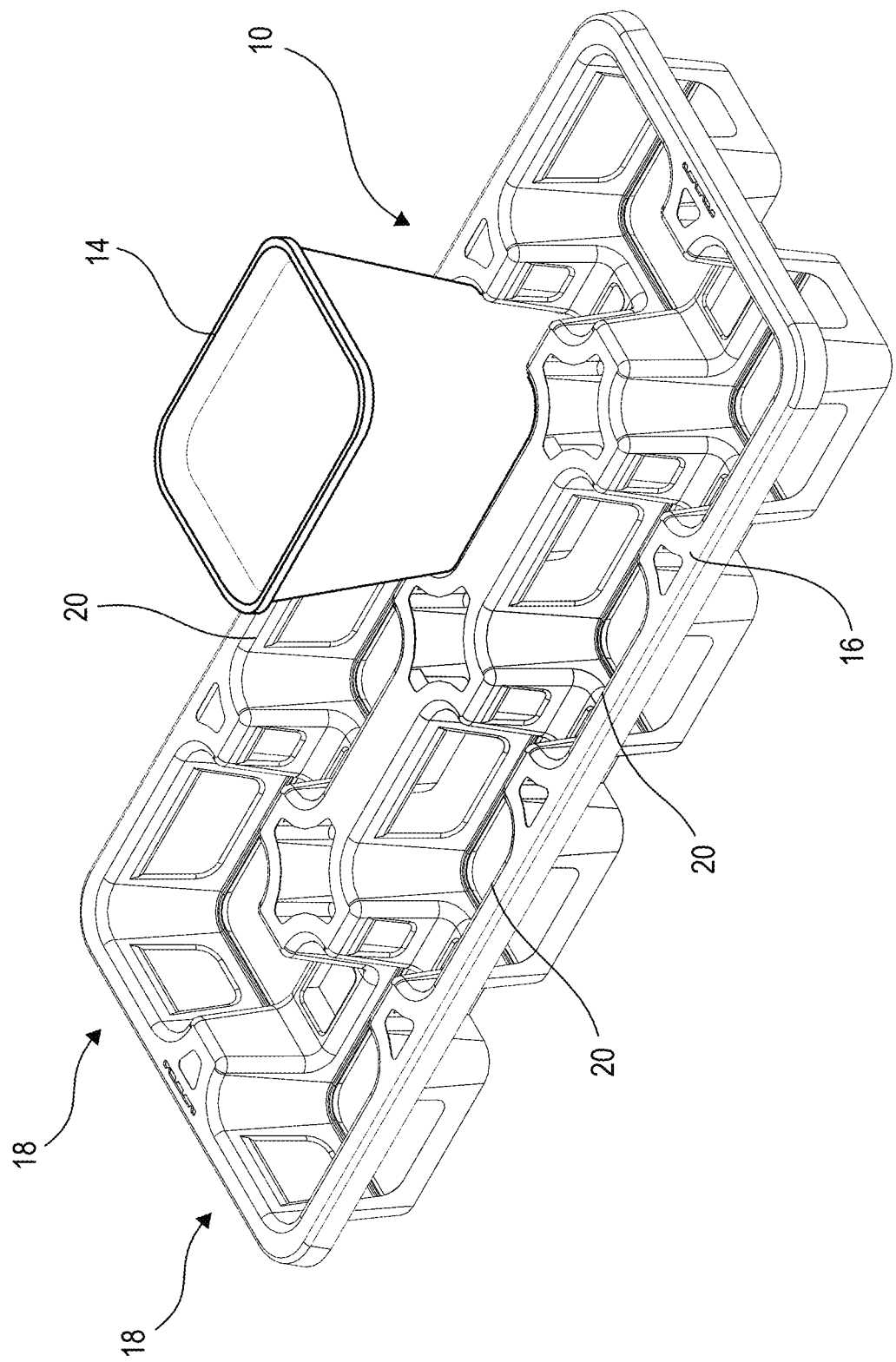
FIG. 1 is a perspective view of the plant pot and plant pot tray of the present technology.
Figure 2A:
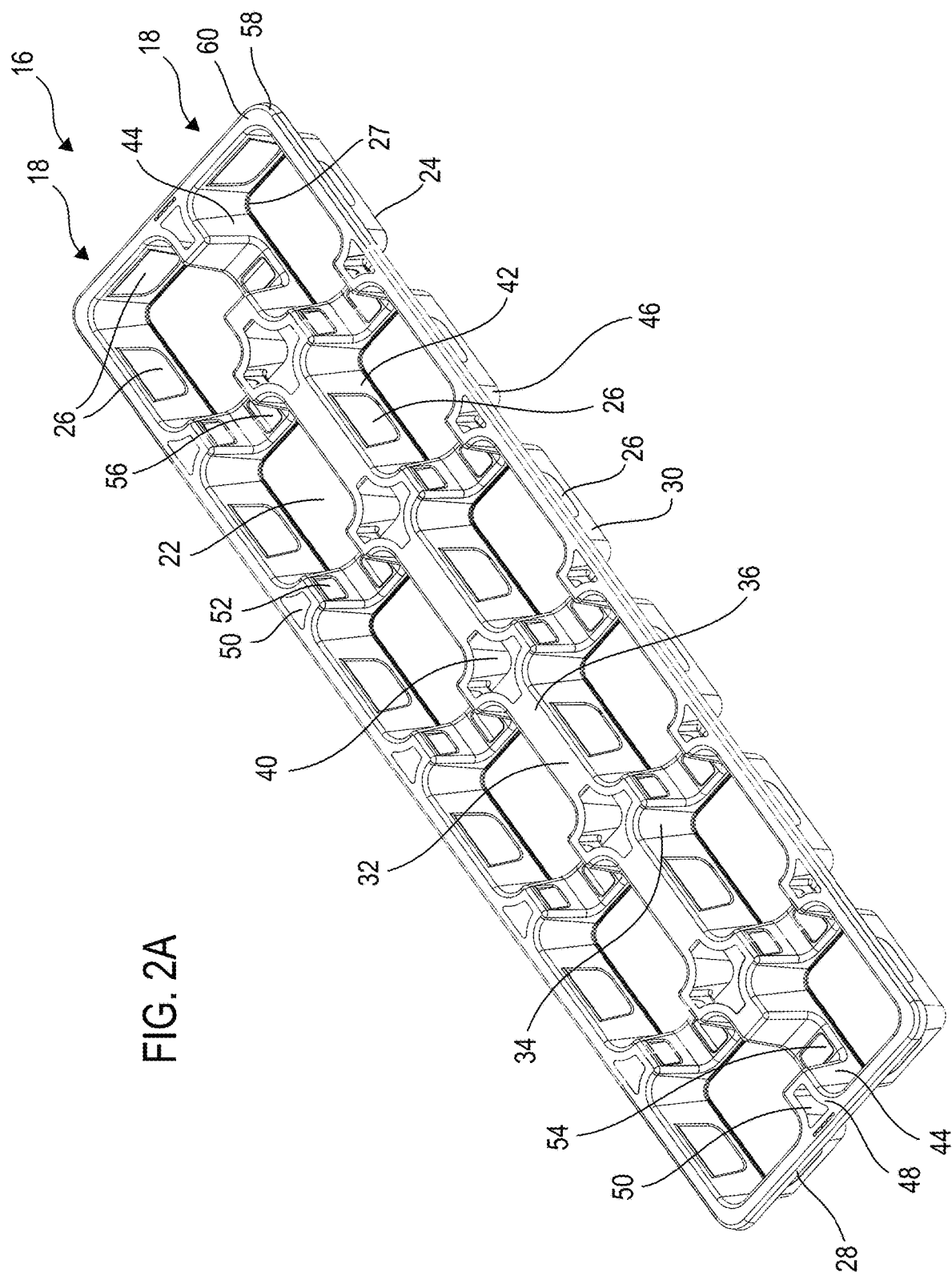
FIG. 2A is a perspective view of the plant pot tray.
Figure 2B:
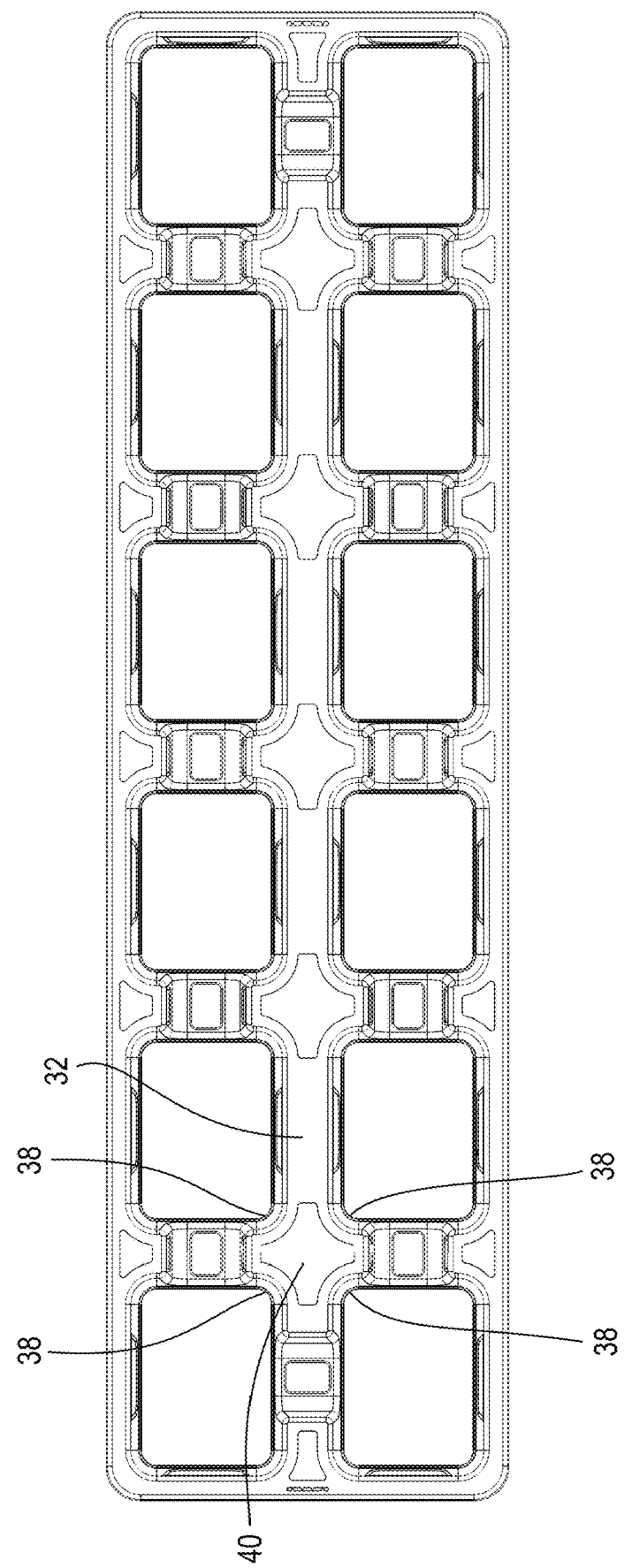
FIG. 2B is a top view of the plant pot tray.

As shown in FIG. 2A, each receptacle 20 has a large central aperture 22 in the base 24 and two openings 26. The large central aperture 22 is bounded by a lip 27 which is slightly above the base 24. The end receptacles 20 have an opening 26 in the ends 28 and an opening 26 in the side 30. The remainder of the receptacles 20 have an opening 26 in the side 30 and an opening 26 in the central divider 32. Divider pillars 34 extend between the base 24 and the top 36 of the central divider 32. As shown in FIG. 2B, the divider pillars 34 form four corners 38. As shown in FIGS. 2A and B, the base 24, the top 36 and the divider pillars 34 define a central bore 40 that is star shaped. As shown in FIG. 2A, the divider wall 42, which is between the corners 38, includes the opening 26. The sides 30 have side pillars 46 opposite the divider pillars 34 and the ends 28 have end pillars 48 opposite the divider pillars 34. The side pillars 46 have both top apertures 50 and side apertures 52. The end pillars 48 only have top apertures 50. The base 24 has a base end aperture 54 between each end pillar 48 and each divider pillar 34 and a base side aperture 56 between each side pillar 46 and each divider pillar 34. The ends 28 and the sides 30 define a rim 58 around the top 60 of the tray 16.

The base 24, the ends 28, the sides 30 and the central divider 32 define the receptacles 20 and provide structural integrity to the tray 16, while the various apertures reduce the material needed to manufacture the tray 16. The openings 26 in the ends 28 and in the sides 30 function as viewing windows, allowing for ease of reading a plant identifier.

Figure 3A:
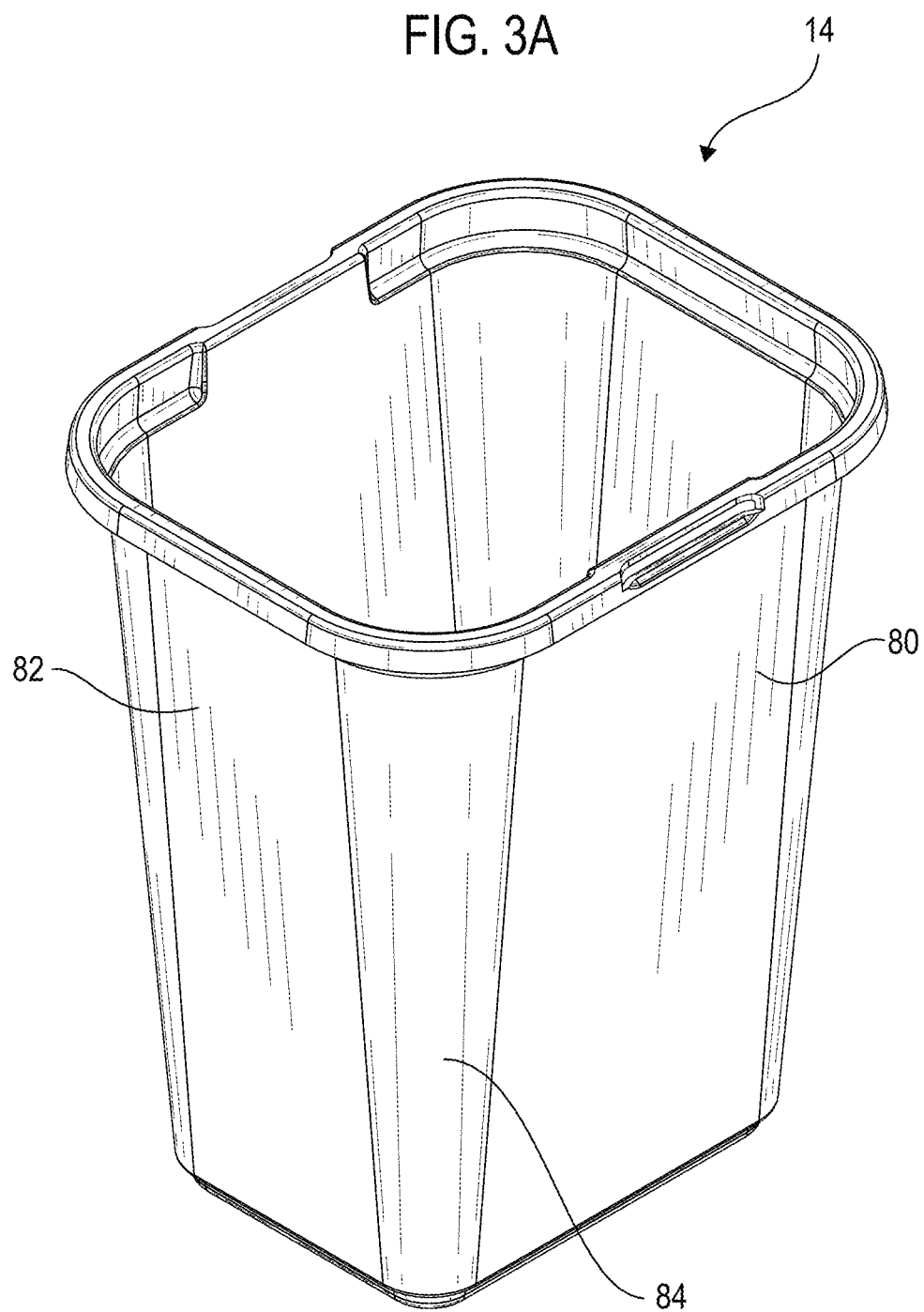
FIG. 3A is a perspective view of the plant pot.
Figure 3B:
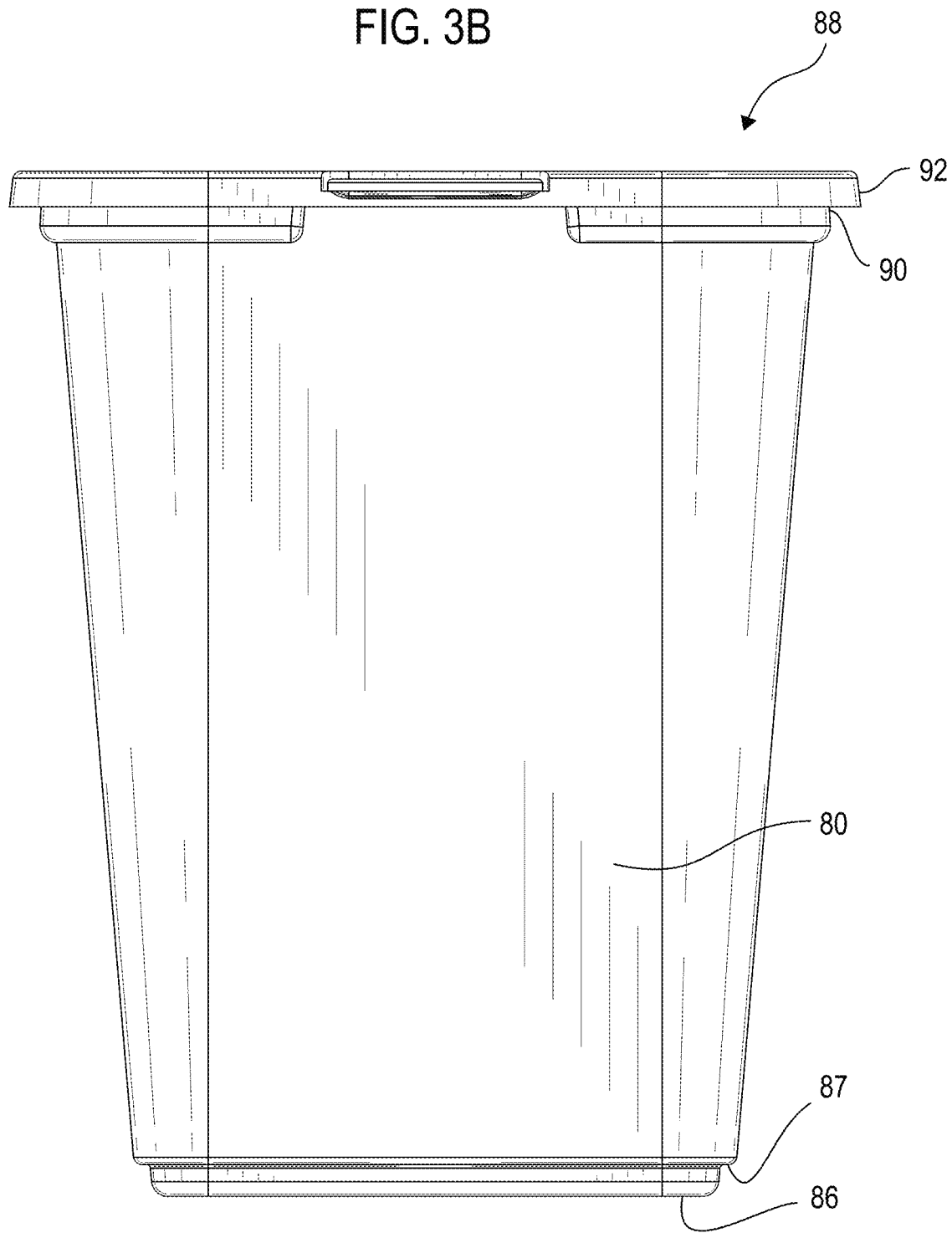
FIG. 3B is a side view of the plant pot.
Figure 3C:
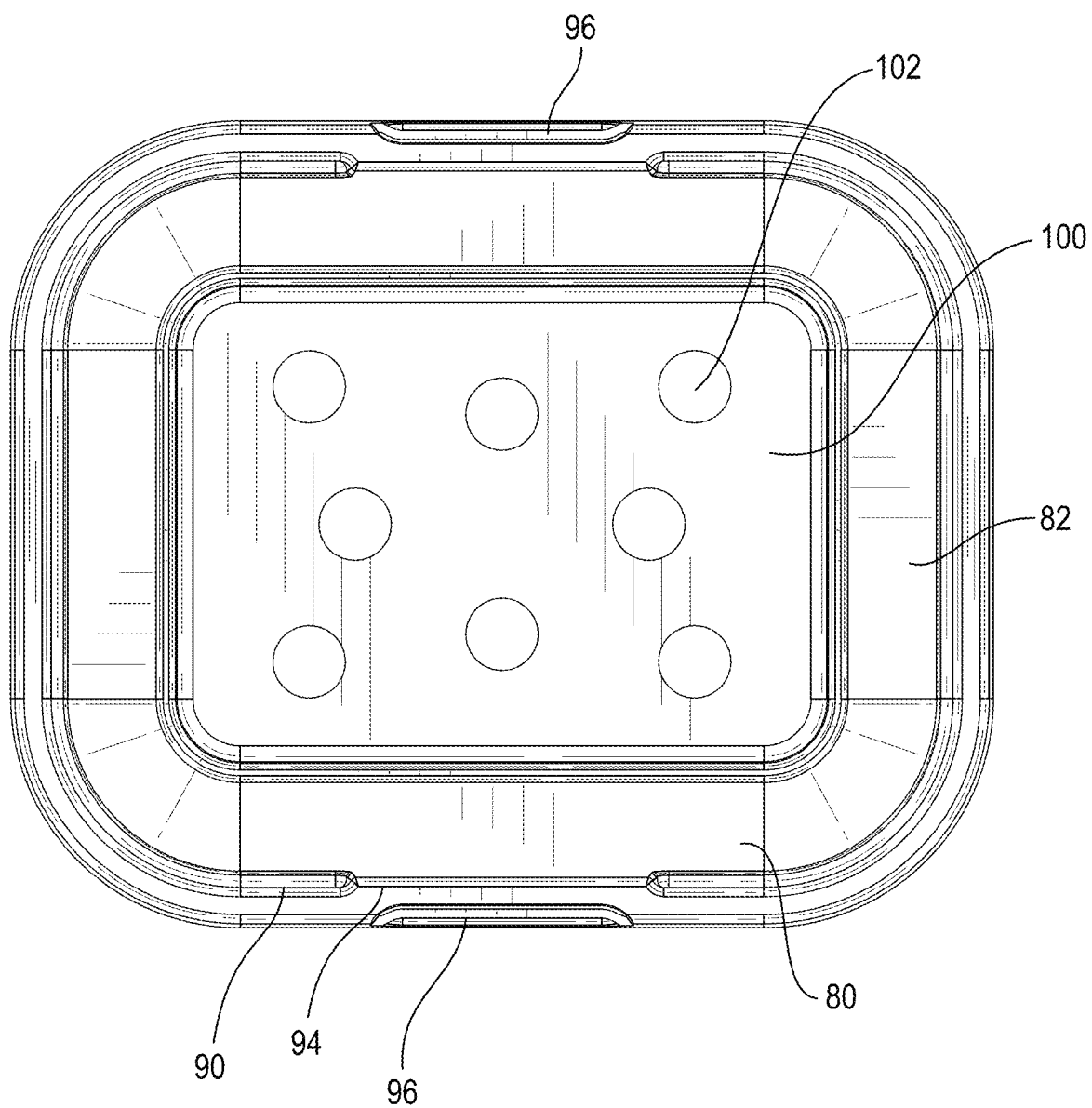
FIG. 3C is a top inside view of the plant pot.

As shown in FIG. 3A, each plant pot 14 has two long walls 80 and two short walls 82 with a rounded corner 84 between each long wall 80 and each short wall 82 to form a rectangular plant pot 14. As shown in FIG. 3B, between the bottom 86 and the walls 80, 82 is a lower step 87. At the top end, generally referred to as 88, there is an upper step 90 and a rim 92. The rim 92 allows for separating stacked plant pots 14 easily. As shown in FIG. 3C, the upper step 90 includes a gap 94 on each long wall 80. Adjacent the gap 94 is a slot 96 in the rim 92. The gap 94 defines a reinforcing block, while the slot 96 is configured to accept a plant name tag. It can be seen that the interior 100 of the plant pot 14 is rectangular and includes between four and ten, preferably eight contact openings 102.

Figure 4:
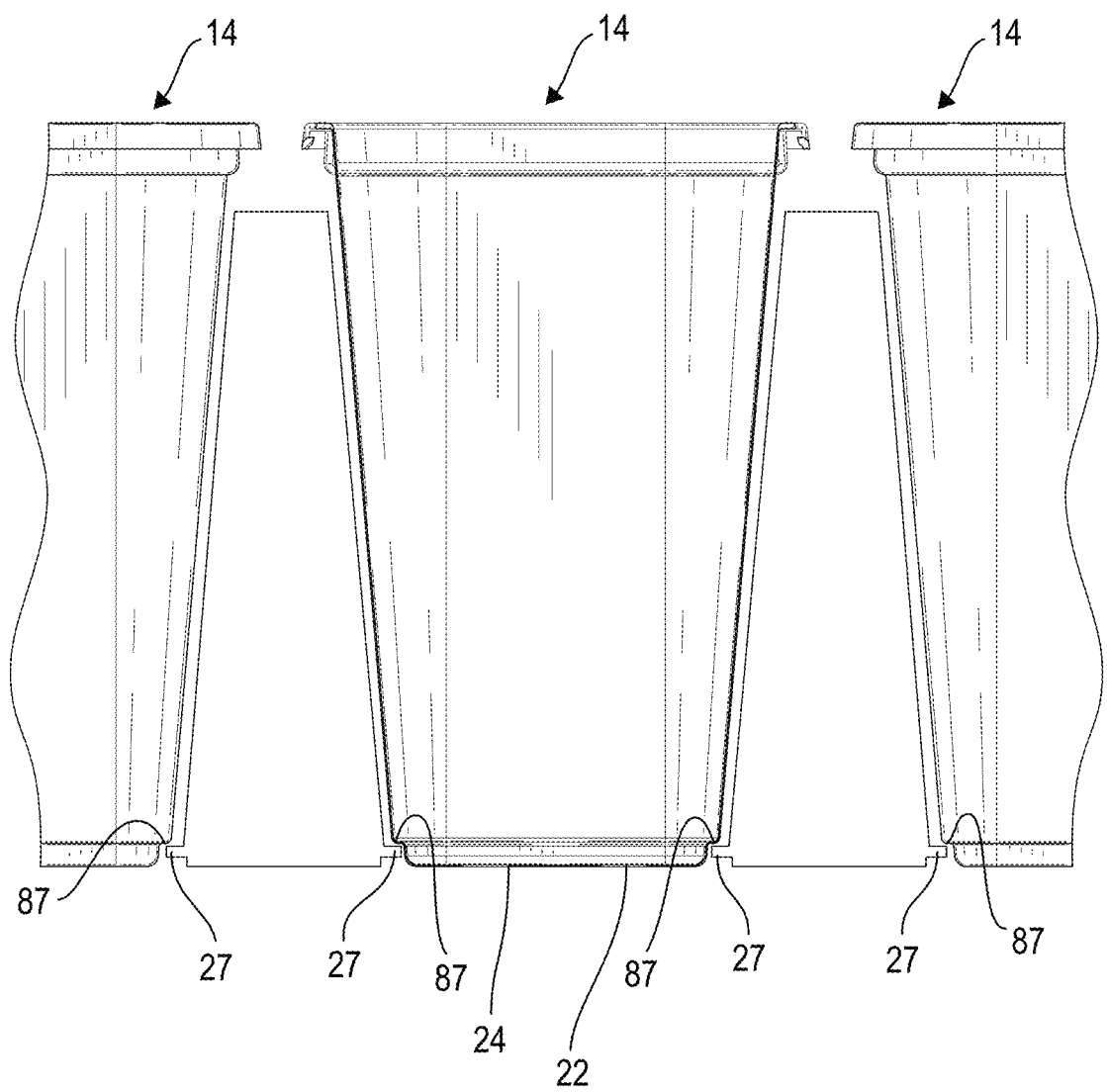
FIG. 4 is a side sectional view showing the plant pots sitting in the receptacles.

As shown in FIG. 4, the lower step 87 of the plant pot 14 fits snugly in the lip 27 above the base 24, with the bottom 86 fitting in the central aperture 22 and aligning with the base 24. Each of the trays 16 and the plant pots 14 are a unit body construction and are made of a plastic polymeric material. Both are injection molded.

In use, the plant pots 14 are filled with soil or other growth medium, seeded, or planted and are placed on a substrate. The preferred substrate is sieved aggregate, rockwool and other porous, uniform substrates that is laid evenly to provide a uniform, level surface. The substrate is flooded and the water or nutrient solution is evenly taken up by the soil or other growth medium in the plant pots 14. As the plant pots 14 sit directly on the substrate, the amount of water or nutrient solution is minimized and the plant pots take up a uniform amount of water or nutrient solution.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A plant pot and tray system, the system comprising:
   a plurality of plant pots, each plant pot defining an interior, each plant pot comprising:
      a bottom, which includes a plurality of apertures,
      a lower step extending outwardly and upwardly from the bottom,
      four sides extending upwardly from the lower step,
      an upper step extending outwardly from the sides,
      a rim extending outwardly from the upper step, at least one slot in the rim, and
      a reinforcing block on the upper step adjacent to each slot and facing the interior; and
   a tray, the tray comprising:
      a plurality of receptacles, each defining an interior, the plurality of receptacles defined by a base,
      a raised lip above the base extending into the interior of each receptacle and which defines a central aperture in each receptacle,
      at least one of four sides that extend upwardly from the base, and
      a central divider that extends upwardly from the base,
   wherein the lower step of each plant pot is configured to sit on the raised lip and the bottom of each plant pot is configured to extend through the central aperture and be aligned with the base.

2. The plant pot and tray system of claim 1, wherein the sides of the tray include a viewing window in each receptacle.

3. The plant pot and tray system of claim 2, wherein the sides of the tray define side pillars between the viewing windows and each side pillar includes a top aperture and a side aperture.

4. The plant pot and tray system of claim 3, wherein the central divider defines divider pillars opposite the side pillars.

5. The plant pot and tray system of claim 4, wherein the central divider includes at least one aperture between the divider pillars.

6. The plant pot and tray system of claim 5, wherein there are two rows of at least three receptacles.

7. The plant pot and tray system of claim 6, wherein there are two rows of four receptacles.

8. The plant pot and tray system of claim 6, wherein the divider pillars, the base and a top of the central divider define a central bore.

9. The plant pot and tray system of claim 8, wherein each plant pot is rectangular and each receptacle is rectangular.

10. The plant pot and tray system of claim 9, wherein each plant pot has a rounded corner between the sides.

11. The plant pot and tray system of claim 10, wherein the at least one slot is configured to accept a plant tag.

12. A method of watering plants, the method comprising:
   selecting a plant pot and tray system including:
      a plurality of plant pots, each having at least one plant in a growth medium in the pot, each of the plurality of pots including;
         a bottom with a plurality of apertures,
         a lower step which extends upwardly and outwardly from the bottom, and
         sides that extend upwardly from the lower step; and
      a tray, the tray including;
         a plurality of receptacles, each defining an interior, the plurality of receptacles defined by a base, a raised lip above the base extending into the interior and which defines a central aperture in each receptacle,
at least one of four sides that extend upwardly from the base, and
a central divider that extends upwardly from the base;
nesting each pot of the plurality of pots in a respective receptacle of the plurality of receptacles such that the lower step of the plant pot sits on the raised lip of the respective receptacle and the bottom of each plant pot extends through the central aperture and is aligned with the base;
selecting a substrate;
locating the plant pot and tray system on the substrate, such that the base of each plant pot contacts the substrate; and
flooding the substrate, thereby watering the plants.

13. A plant pot and tray system, the system comprising:
a plurality of plant pots, each plant pot comprising:
   a bottom, which includes a plurality of apertures,
   a lower step extending outwardly and upwardly from the bottom,
   four sides extending upwardly from the lower step,
   an upper step extending outwardly from the sides,
   a rim extending outwardly from the upper step; and
a tray, the tray comprising:
   a plurality of receptacles, the plurality of receptacles each defining an interior, the plurality of receptacles defined by a base,
   a raised lip above the base extending into the interior and which defines a central aperture in each receptacle,
   at least one of four sides that extend upwardly from the base, and
   a central divider that extends upwardly from the base,
wherein the lower step of each plant pot is configured to sit on the raised lip and the bottom of each plant pot is configured to extend through the central aperture and be aligned with the base.

14. The plant pot and tray system of claim 13, wherein the sides of the tray include a viewing window in each receptacle.

15. The plant pot and tray system of claim 14, wherein the sides of the tray define side pillars between the viewing windows and each side pillar includes a top aperture and a side aperture.

16. The plant pot and tray system of claim 15, wherein the central divider defines divider pillars opposite the side pillars.

17. The plant pot and tray system of claim 16, wherein the central divider includes at least one aperture between the divider pillars.

18. The plant pot and tray system of claim 17, wherein there are two rows of at least three receptacles.

19. The plant pot and tray system of claim 18, wherein the tray consists of an injected molded plastic polymer.

\* \* \* \* \*